United States Patent
Fleck et al.

(10) Patent No.: US 12,461,610 B2
(45) Date of Patent: *Nov. 4, 2025

(54) STYLUS AND SENSOR CONTROL CIRCUIT

(71) Applicant: Wacom Co., Ltd., Saitama (JP)

(72) Inventors: David Charles Fleck, Vancouver, WA (US); Sadao Yamamoto, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/743,000

(22) Filed: Jun. 13, 2024

(65) Prior Publication Data

US 2024/0329760 A1    Oct. 3, 2024

Related U.S. Application Data

(63) Continuation of application No. 17/848,897, filed on Jun. 24, 2022, now Pat. No. 12,061,754, which is a
(Continued)

(51) Int. Cl.
  *G06F 3/0354* (2013.01)
  *G06F 3/038* (2013.01)

(52) U.S. Cl.
  CPC ........ *G06F 3/03545* (2013.01); *G06F 3/0383* (2013.01)

(58) Field of Classification Search
  None
  See application file for complete search history.

(56) References Cited

U.S. PATENT DOCUMENTS

| 5,793,360 A | 8/1998 | Fleck et al. |
| 11,003,260 B2 | 5/2021 | Fleck et al. |
| (Continued) | | |

FOREIGN PATENT DOCUMENTS

| JP | 2007249670 A | 9/2007 |
| JP | 2009217604 A | 9/2009 |
| (Continued) | | |

OTHER PUBLICATIONS

Translation of JP2018505459A into English. (Year: 2018).*

*Primary Examiner* — Brian M Butcher
(74) *Attorney, Agent, or Firm* — Seed Intellectual Property Law Group LLP

(57) ABSTRACT

A stylus includes a first transmission circuit, a second transmission circuit, and a control circuit which controls the first and second transmission circuits according to a first transmission mode in which the control circuit controls the first transmission circuit to transmit a first downlink signal from a tip electrode and controls the second transmission circuit to not transmit a second downlink signal from a tail electrode, a second transmission mode in which the control circuit controls the first transmission circuit to not transmit the first downlink signal from the tip electrode and controls the second transmission circuit to transmit the second downlink signal from the tail electrode, and a third transmission mode in which the control circuit controls the first transmission circuit to transmit the first downlink signal from the tip electrode and controls the second transmission circuit to transmit the second downlink signal from the tail electrode.

7 Claims, 11 Drawing Sheets

Related U.S. Application Data continuation of application No. 17/316,456, filed on May 10, 2021, now Pat. No. 11,397,480, which is a continuation of application No. 16/502,225, filed on Jul. 3, 2019, now Pat. No. 11,003,260.

(60) Provisional application No. 62/716,536, filed on Aug. 9, 2018.

(56) References Cited

U.S. PATENT DOCUMENTS

| | | |
|---|---|---|
| 11,397,480 B2 | 7/2022 | Fleck et al. |
| 2012/0327040 A1 | 12/2012 | Simon et al. |
| 2017/0185176 A1 | 6/2017 | Katsurahira |
| 2017/0192537 A1 | 7/2017 | Timothy et al. |
| 2018/0052534 A1 | 2/2018 | Ron et al. |
| 2018/0338065 A1 | 11/2018 | Zyskind et al. |
| 2019/0265808 A1 | 8/2019 | Zhang et al. |

FOREIGN PATENT DOCUMENTS

| | | | |
|---|---|---|---|
| JP | 2018505459 A | 2/2018 | |
| WO | WO 2016084424 A1 | 6/2016 | |

* cited by examiner 10 (100)

STYLUS AND SENSOR CONTROL CIRCUIT

BACKGROUND

Technical Field

The present disclosure relates to a stylus and a sensor control circuit.

Background Art

There is a known stylus for an electronic device modeled on a pencil with an eraser.

A stylus which includes an antenna also on a tail side opposite a tip side from which a pen signal is transmitted and which can transmit an eraser signal from the antenna is disclosed in each of U.S. Pat. No. 5,793,360 and U.S. Patent Application Publication No. 2018/0052534.

To reduce a time lag between a point in time of contact to the stylus and a point in time of position detection by an electronic device, the pen signal or the eraser signal (hereinafter, collectively referred to as a "downlink signal") may be transmitted even when the stylus is in a so-called hover state. This improves operation response of the stylus, but consumption of electrical energy increases with an increase in transmission time of the downlink signal.

The problem does not occur in a system triggered by energy provided from the outside to generate and transmit the downlink signal, such as electromagnetic radiation (EMR: registered trademark) described in U.S. Pat. No. 5,793,360. However, the problem may occur in an active system that uses electrical energy stored in the stylus to generate and transmit the downlink signal. Particularly, the active-type stylus described in U.S. Patent Application Publication No. 2018/0052534 simultaneously transmits two types of downlink signals so as to handle contact on either one of the tip side and the tail side, and this further increases the consumption of electrical energy.

BRIEF SUMMARY

An object of the present disclosure is to provide an active-type stylus and a sensor control circuit capable of reducing the consumption of electrical energy while securing the operation response in a configuration in which downlink signals can be transmitted from both the tip side and the tail side.

A stylus according to a first aspect of the present disclosure includes a cylindrical housing, a tip portion provided on a tip side of the housing and including a tip electrode, a tail portion provided on a tail side of the housing and including a tail electrode, a power circuit provided in the housing, a first transmission circuit which, in operation, receives power from the power circuit and generates a first downlink signal that is transmitted toward an outside of the housing through the tip electrode, a second transmission circuit which, in operation, receives power from the power circuit and generates a second downlink signal that is transmitted toward the outside of the housing through the tail electrode, wherein the second downlink signal is different from the first downlink signal, and a control circuit which, in operation, controls the first transmission circuit and the second transmission circuit according to a plurality of transmission modes. The transmission modes include a first transmission mode in which the control circuit controls the first transmission circuit to transmit the first downlink signal from the tip electrode and controls the second transmission circuit to stop transmission of the second downlink signal from the tail electrode, and a second transmission mode in which the control circuit controls the first transmission circuit to stop transmission of the first downlink signal from the tip electrode and controls the second transmission circuit to transmit the second downlink signal from the tail electrode. In a hover state in which both the tip portion and the tail portion do not contact a touch surface of an electronic device including a touch sensor, the control circuit controls according to the first transmission mode or the second transmission mode based on a determination regarding a grasp state of the housing.

A sensor control circuit according to a second aspect of the present disclosure is a circuit connected to a sensor electrode, the sensor control circuit comprising:
a processor; and a memory device storing instructions that, when executed by the processor, cause the sensor control circuit to: receive a first downlink signal and a second downlink signal from a stylus through the sensor electrode, the first downlink signal being different from the second downlink signal, generate an uplink signal including data corresponding to the first downlink signal or the second downlink signal, and transmit the uplink signal through the sensor electrode, wherein the stylus is configured to transmit the first downlink signal through a tip electrode provided on a tip side of a housing of the stylus, and to transmit the second downlink signal through a tail electrode provided on a tail side of the housing of the stylus.

According to the present disclosure, consumption of electrical energy can be reduced while operation response is secured in the configuration in which the downlink signals can be transmitted from both the tip side and the tail side.

DETAILED DESCRIPTION OF THE PREFERRED EMBODIMENTS

A stylus and a sensor control circuit according to the present disclosure will be described with reference to the attached drawings. Note that the present disclosure is not limited to the following embodiments and modifications, and it is obvious that the present disclosure can be freely changed without departing from the scope of the disclosure. The configurations may also be arbitrarily combined as long as the combination is not technically contradictory.

First Embodiment

First, a stylus 16 according to a first embodiment will be described with reference to FIGS. 1 to 6C.

<Overall Configuration of Position Detection System 10>

Figure 1:
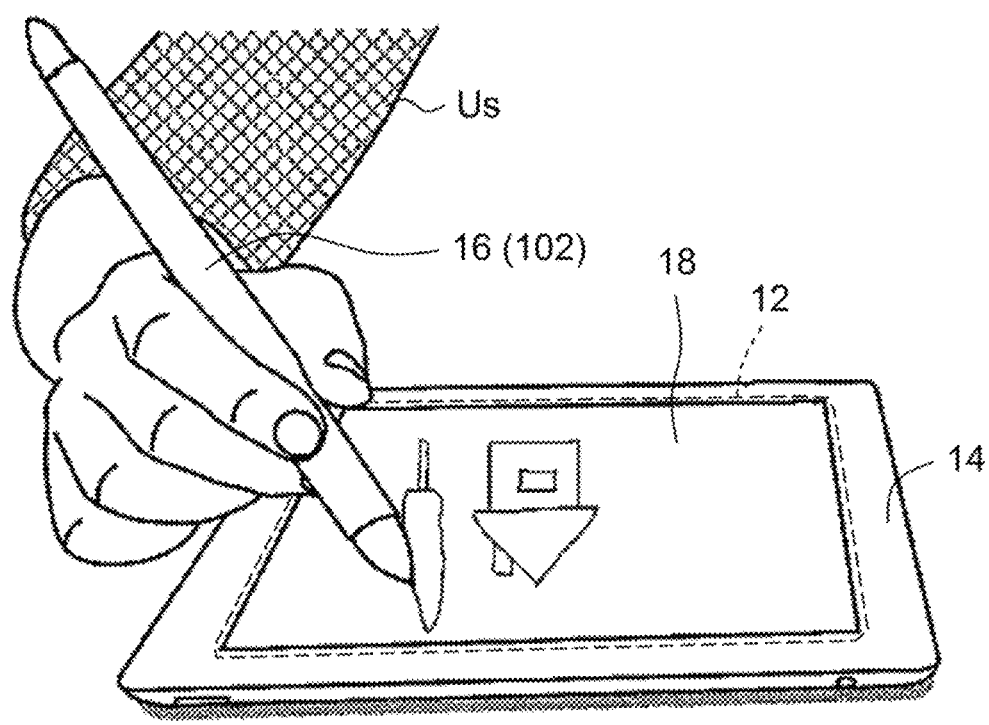
FIG. 1 is an overall configuration diagram of a position detection system provided with a stylus according to a first embodiment.

FIG. 1 is an overall configuration diagram of a position detection system 10 provided with the stylus 16 according to the first embodiment. The position detection system 10 basically includes an electronic device 14 including a display panel 12, and the stylus 16 that is a pen-shaped pointing device.

The electronic device 14 includes, for example, a tablet terminal, a smartphone, or a personal computer. A user Us grasps the stylus 16 with one hand and moves the stylus 16 while pressing a pen nib against a touch surface 18 of the display panel 12, so that the user Us can write a drawing or a character on the electronic device 14.

The stylus 16 can communicate with the electronic device 14 in one direction or both directions. Hereinafter, a signal transmitted by the stylus 16 toward the electronic device 14 will be referred to as a "downlink signal," and a signal transmitted by the electronic device 14 toward the stylus 16 will be referred to as an "uplink signal" in some cases. Note that the stylus 16 is an "active type" stylus which uses electrical energy stored in the stylus 16 to actively generate a signal and which transmits the signal as a downlink signal toward the electronic device 14.

<Configuration of Electronic Device 14>

Figure 2:
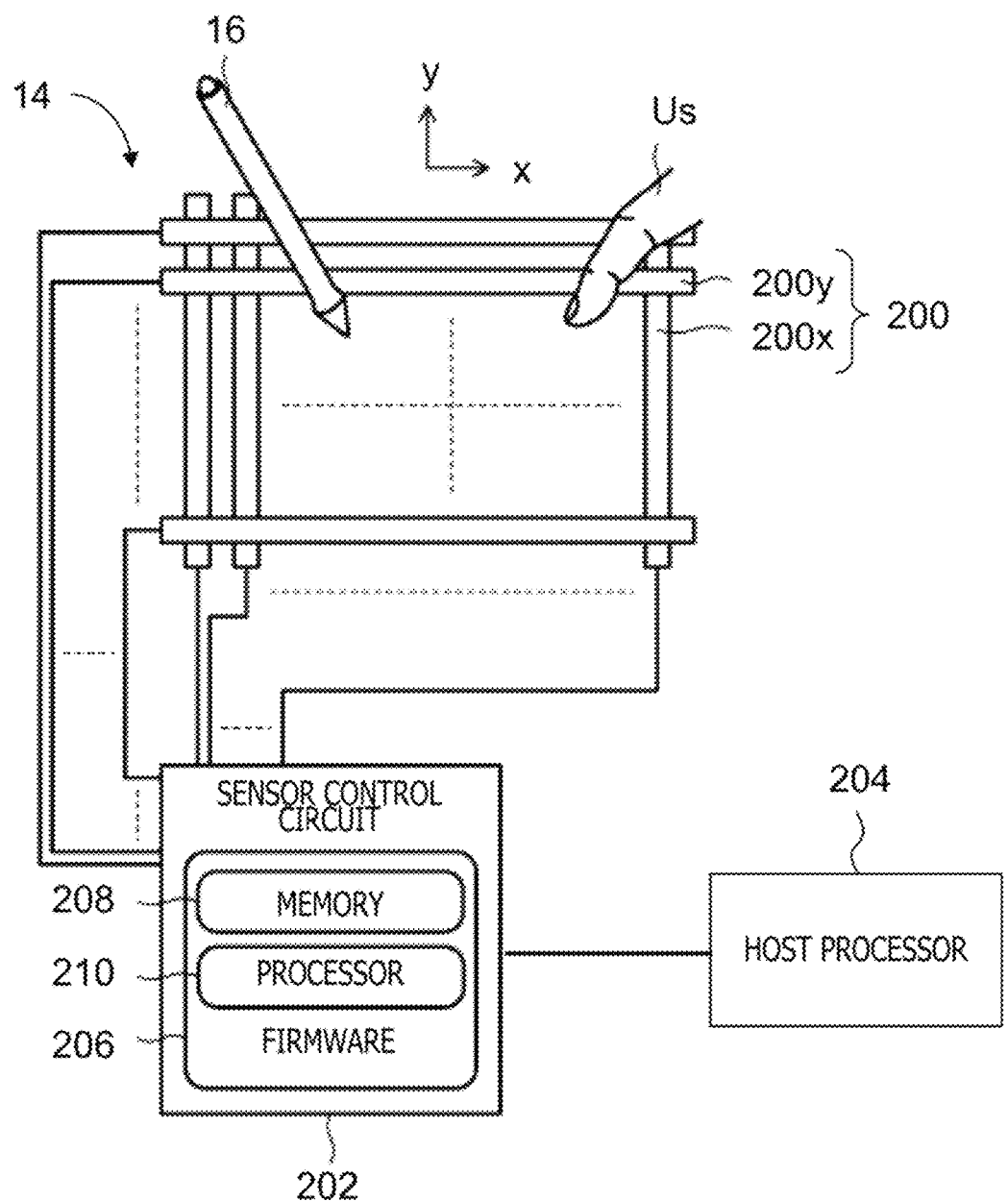
FIG. 2 is a schematic block diagram of an electronic device illustrated in FIG. 1.

FIG. 2 is a schematic block diagram of the electronic device 14 illustrated in FIG. 1. The electronic device 14 includes sensor electrodes 200, a sensor control circuit 202, and a host processor 204. Note that an x-direction and a y-direction illustrated in FIG. 2 respectively correspond to an X-axis and a Y-axis of a Cartesian coordinate system defined on a plane formed by the sensor electrodes 200.

The sensor electrodes 200 are a plurality of electrodes arranged between the display panel 12 and the touch surface 18 (FIG. 1). The sensor electrodes 200 include a plurality of X electrodes 200$x$ for detecting the X-coordinate (position in the x-direction) and a plurality of Y electrodes 200$y$ for detecting the Y-coordinate (position in the y-direction). The X electrodes 200$x$ are provided to extend in the y-direction and are arranged at regular intervals in the x-direction. The Y electrodes 200$y$ are provided to extend in the x-direction and are arranged at regular intervals in the y-direction.

The sensor control circuit 202 is an integrated circuit that can execute firmware 206 and is connected to each of the plurality of electrodes included in the sensor electrodes 200. The firmware 206 includes processor-readable instructions stored in a memory device 208 that, when executed by a processor 210, causes the sensor control circuit 202 to realize a touch detection function of detecting a touch by the user Us and a pen detection function of detecting a state of the stylus 16.

The touch detection function includes, for example, a two-dimensional scan function of the sensor electrodes 200, a creation function of a heat map (two-dimensional position distribution of detection level) on the sensor electrodes 200, and a region classification function (for example, classification of fingers and palm) on the heat map. The pen detection function includes, for example, a two-dimensional scan function of the sensor electrodes 200, a reception and analysis function of the downlink signal, an estimation function of the state (for example, position, posture, and pen pressure) of the stylus 16, and a generation and transmission function of the uplink signal including an instruction for the stylus 16.

The host processor 204 is a processor including a CPU (Central Processing Unit) or a GPU (Graphics Processing Unit). The host processor 204 reads a program from a memory not illustrated and executes the program to generate, for example, digital ink by using data from the sensor control circuit 202.

<Configuration of Stylus 16>

Figure 3A:
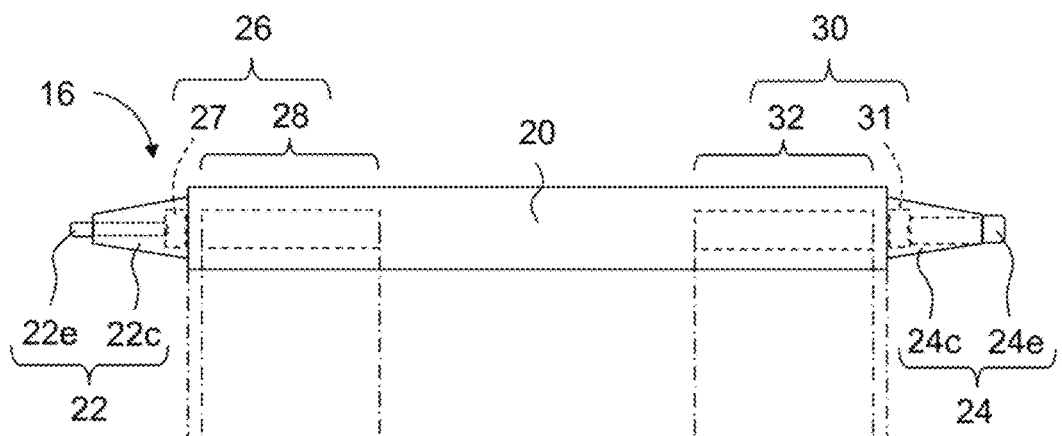
FIG. 3A is a side view of the stylus illustrated in FIG. 1.
Figure 3B:
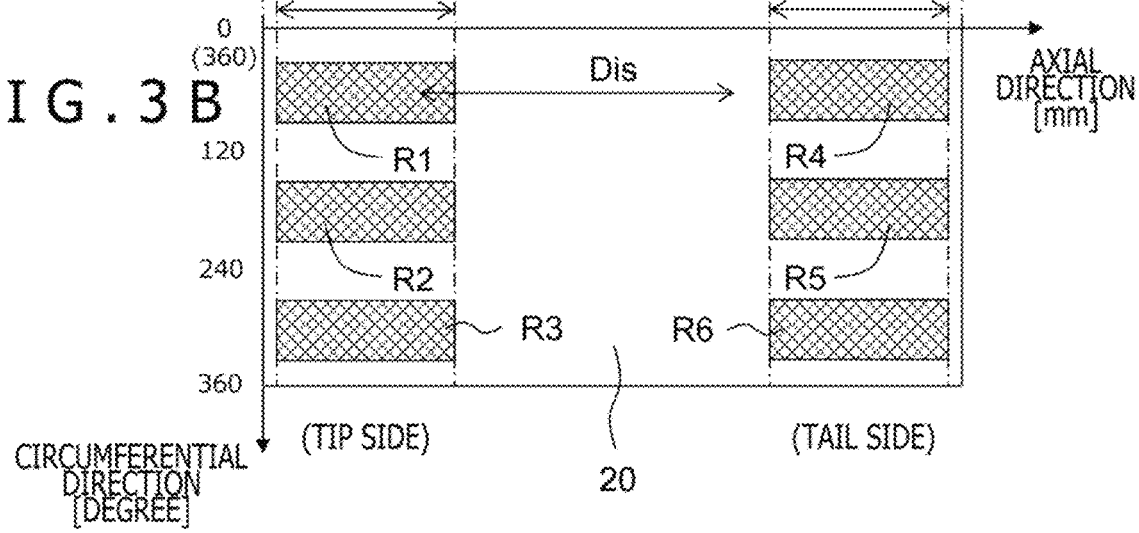
FIG. 3B is a partial development diagram of a housing of the stylus illustrated in FIG. 1.

FIGS. 3A and 3B are external views of the stylus 16 illustrated in FIG. 1. More specifically, FIG. 3A is a side view of the stylus 16, and FIG. 3B is a partial development diagram of a housing 20.

As illustrated in FIG. 3A, the stylus 16 includes the housing 20 in a cylindrical shape, a tip portion 22 provided on one end side (hereinafter, referred to as a tip side) of the housing 20, and a tail portion 24 provided on the other end side (hereinafter, referred as a tail side) of the housing 20.

The cross-sectional shape of the housing 20 is, for example, a Reuleaux triangle. The shape allows a user to easily hold the stylus 16 and reduce fatigue of the hand.

The tip portion 22 in a roughly conical shape includes a tip electrode 22$e$ made of a conductive material and a tip cover 22$c$ covering part or all of the tip electrode 22$e$. The tip electrode 22$e$ is an electrode that outputs a pen signal described later and is attached to a core not illustrated. A tip side sensor group 26 is provided on the tip side of the housing 20. The tip side sensor group 26 includes an end portion sensor 27 that detects pressing toward the tip portion 22 and a contact sensor 28 that detects contact by a human body.

The tail portion 24 in a roughly conical shape includes a tail electrode 24$e$ made of a conductive material and a tail cover 24$c$ covering part or all of the tail electrode 24$c$. The tail electrode 24$c$ is an electrode that outputs an eraser signal described later and is attached to a core not illustrated. A tail side sensor group 30 is provided on the tail side of the housing 20. The tail side sensor group 30 includes an end portion sensor 31 that detects pressing toward the tail portion 24 and a contact sensor 32 that detects contact by a human body.

The end portion sensor 27 (31) is, for example, a pressure sensor using a variable capacitor that detects a change in capacitance generated by pressing toward the tip portion 22 (tail portion 24). Note that the end portion sensors 27 and 31 may be pressure sensors using another system or may be pressure switches that are switched on and off on the basis of predetermined pressing (threshold).

The contact sensors 28 and 32 are, for example, self-capacitance or mutual-capacitance touch sensors. Note that the contact sensors 28 and 32 may be sensors (specifically, pressure sensors or heat sensors) that detect energy supplied by contact by a human body or may be optical sensors that detect a contact position of a human body. The contact sensors 28 and 32 may be housed in the housing 20 or may be attached to an outer peripheral surface of the housing 20 according to the type of detection system.

As illustrated in FIG. 3B, the contact sensor 28 on the tip side includes rectangular detection regions R1 to R3 extending in an axial direction of the housing 20 and curved in a circumferential direction. The detection regions R1 to R3 in three locations are arranged in the middle of apexes adjacent to each other along the circumference of the housing 20. Similarly, the contact sensor 32 on the tail side includes rectangular detection regions R4 to R6 extending in the axial direction of the housing 20 and curved in the circumferential direction. The detection regions R4 to R6 in three locations are arranged in the middle of apexes adjacent to each other along the circumference of the housing 20.

Here, the coordinates in the circumferential direction (vertical axis) are defined such that the apexes of the cross-sectional shape are at positions with angles of 0 degrees, 120 degrees, and 240 degrees in the circumferential direction. Note that, as can be understood from FIG. 3B, the contact sensors 28 and 32 are provided in relatively flat locations (in other words, sections with large curvature) compared to the apexes of the triangle (0 degrees, 120 degrees, and 240 degrees) on the outer peripheral surface of the housing 20.

The detection regions R1 and R4 are arranged at corresponding positions in the circumferential direction (positions of center lines are at 60 degrees). A length of the detection region R1 in the axial direction is L1, and a length of the detection region R4 in the axial direction is L2. L2 may be the same length as the length of L1 or may be a different length. Also, the detection regions R1 and R4 are arranged to be spaced apart from each other by a distance Dis. The distance Dis is a distance designed by considering a size of the hand of the user Us and is, for example, 50 mm or more or 100 mm or more.

The detection regions R2 and R5 are arranged at corresponding positions in the circumferential direction (positions of center lines are at 180 degrees). The detection regions R3 and R6 are arranged at corresponding positions in the circumferential direction (positions of center lines are at 300 degrees). Note that the detection regions R2 and R5 (or detection regions R3 and R6) are arranged so as to satisfy the relative positional relation similar to the detection regions R1 and R4.

Figure 4:
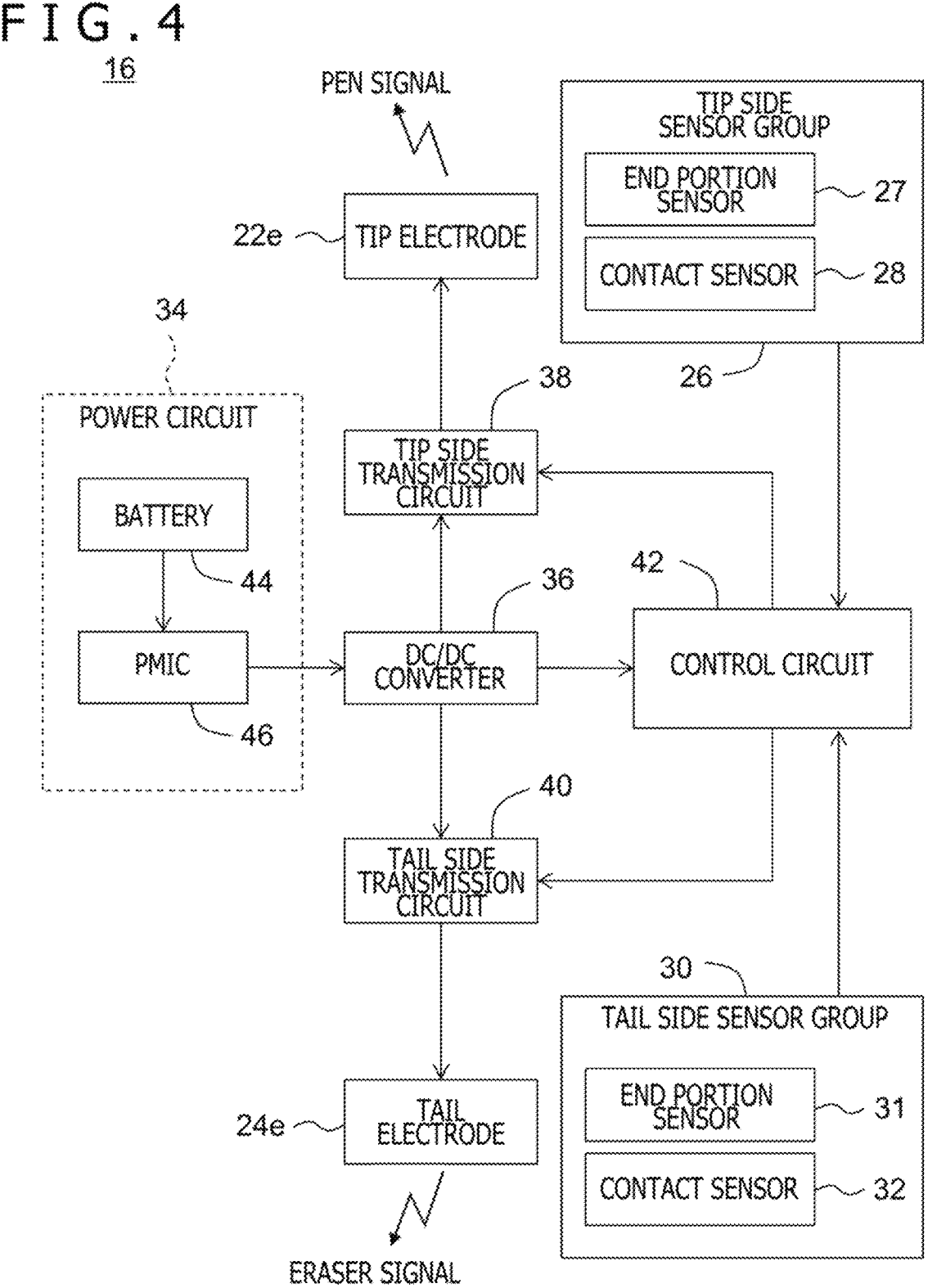
FIG. 4 is an electrical block diagram of the stylus illustrated in FIG. 1.

FIG. 4 is an electrical block diagram of the stylus 16 illustrated in FIG. 1. In addition to the tip electrode 22e, the tail electrode 24c, the tip side sensor group 26, and the tail side sensor group 30 (FIGS. 3A and 3B), the stylus 16 includes a power circuit 34, a DC/DC converter 36, a tip side transmission circuit 38 (first transmission circuit), a tail side transmission circuit 40 (second transmission circuit), and a control circuit 42.

The power circuit 34 generates a drive voltage of the stylus 16 and outputs the obtained direct current (DC) voltage toward the DC/DC converter 36. Specifically, the power circuit 34 includes a battery 44 made of, for example, a lithium-ion battery, and a power management IC (integrated circuit) (hereinafter, PMIC 46) that manages power of the battery 44.

The DC/DC converter 36 converts the DC voltage input from the power circuit 34 into DC voltage suitable for each of the circuits and outputs the DC voltage to each of the tip side transmission circuit 38, the tail side transmission circuit 40, and the control circuit 42.

The tip side transmission circuit 38 is a circuit that generates a pen signal (first downlink signal) based on the DC voltage from the DC/DC converter 36. The tail side transmission circuit 40 is a circuit that generates an eraser signal (second downlink signal) based on the DC voltage from the DC/DC converter 36. Each of the tip side transmission circuit 38 and the tail side transmission circuit 40 includes an oscillation circuit that generates a carrier wave signal oscillating at a predetermined frequency and a modulation circuit that uses data included in a control signal from the control circuit 42 to modulate the carrier wave signal. Note that the signal waveform of the carrier wave may be any alternate current waveform, such as a sine wave, a square wave, and a triangle wave.

The control circuit 42 is a microcomputer that manages control including a transmission operation of the downlink signal. The control circuit 42 receives detection signals from the tip side sensor group 26 and the tail side sensor group 30 and outputs control signals to the tip side transmission circuit 38 and the tail side transmission circuit 40. As a result, the control circuit 42 can control transmission by the tip side transmission circuit 38 and the tail side transmission circuit 40 according to a plurality of transmission modes (for example, first, second, and third transmission modes).

The "first transmission mode" here denotes a mode of transmitting the pen signal from the tip electrode 22e and stopping the transmission of the eraser signal from the tail electrode 24c. Also, the "second transmission mode" denotes a mode of stopping the transmission of the pen signal from the tip electrode 22e and transmitting the eraser signal from the tail electrode 24c. Also, the "third transmission mode" denotes a mode of transmitting the pen signal from the tip electrode 22e and transmitting the eraser signal from the tail electrode 24c.

Note that the "pen signal" is a type of downlink signal indicating an intention of using the pen function of the stylus 16 (intension of marking). The "eraser signal" is a type of downlink signal indicating an intension of using the eraser function of the stylus 16 (intension of deleting a mark). The signal waveforms of the eraser signal and the pen signal are made different from each other in order that the electronic device 14 on the receiving side can identify the type of downlink signal.

In a first method, different data may be used to modulate the carrier waves with the same frequency, whereby signal waveforms for the eraser signal and the pen signal may be made different. By way of example, information regarding a pen ID or a state of the stylus 16 (for example, pen pressure or posture) can be used in common, and different values can be used for a specific flag (Invert). Specifically, "Invert" may be set to a value "0" in the case of the pen signal, and "Invert" may be set to a value "1" in the case of the eraser signal. In a second method, the same data may be used to modulate the carrier waves with different frequencies, whereby signal waveforms for the eraser signal and the pen signal may be made different. In a third method, the length of an unmodulated signal may be changed, whereby signal waveforms for the eraser signal and the pen signal may be made different.

<Operation of Stylus 16>

The stylus 16 in the first embodiment is configured in this way. Next, the operation of the stylus 16 (particularly, transmission control by the control circuit 42) will be described with reference to a flow chart of FIG. 5.

At S1, the control circuit 42 determines whether there is contact to the tip portion 22 or the tail portion 24 based on the detection signals from the end portion sensors 27 and 31.

If the tip portion 22 contacts the touch surface 18, the control circuit 42 determines that only the tip portion 22 is in a contact state (S1: tip) and proceeds to S3 described later. Meanwhile, if the tail portion 24 contacts the touch surface 18, the control circuit 42 determines that only the tail portion 24 is in the contact state (S1: tail) and proceeds to S5 described later.

In contrast, if the contact state is not detected from either the tip portion 22 or the tail portion 24, the control circuit 42 determines that the stylus 16 is in a "hover state" (S1: hover) and proceeds to S2.

At S2, the control circuit 42 determines a grasp state of the stylus 16. Here, the control circuit 42 determines whether the detection signals from the contact sensors 28 and 32 satisfy a predetermined condition (hereinafter, referred to as determination condition) for estimating that the stylus 16 is likely in the grasp state. As can be understood from FIG. 1, the typical user Us tends to use a plurality of fingers to grasp the housing 20 (FIGS. 3A and 3B) from the entire circumferential direction at a position as close to a leading end side as possible in order to stabilize writing operation when using the stylus 16. Hereinafter, a specific example of the determination method based on the tendency will be described in detail with reference to FIGS. 6A to 6C.

Figure 6A:
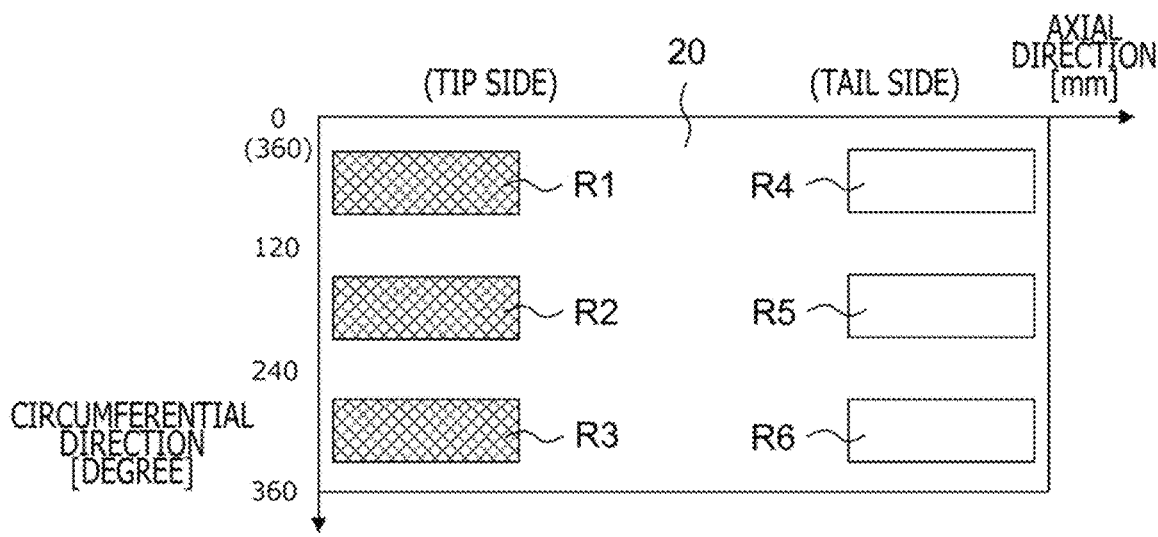
FIG. 6A depicts an example of a determination method of a grasp state.
Figure 6B:
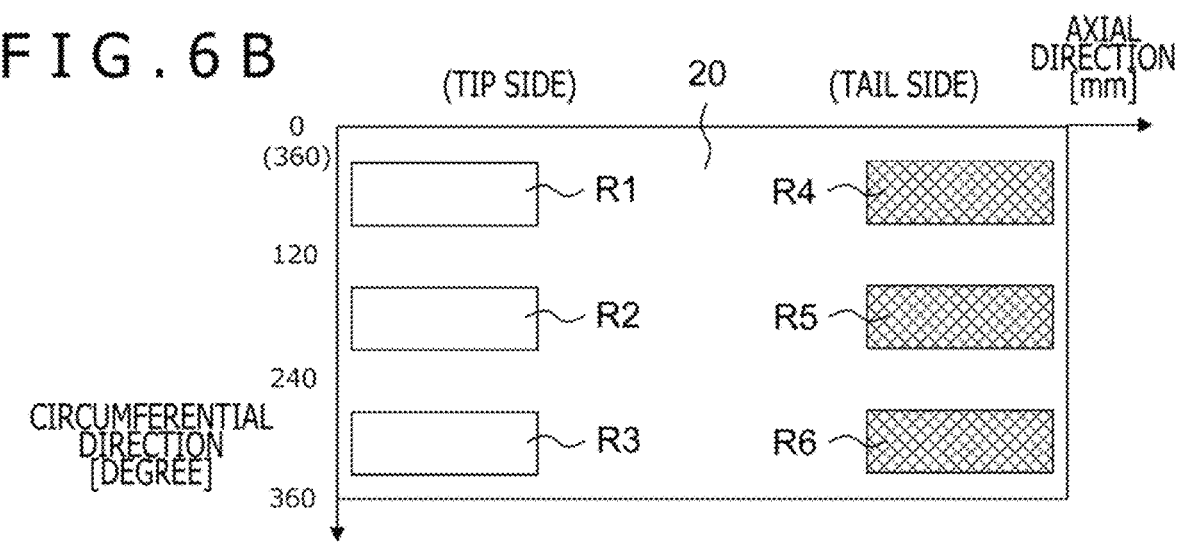
FIG. 6B depicts an example of a determination method of a grasp state.
Figure 6C:
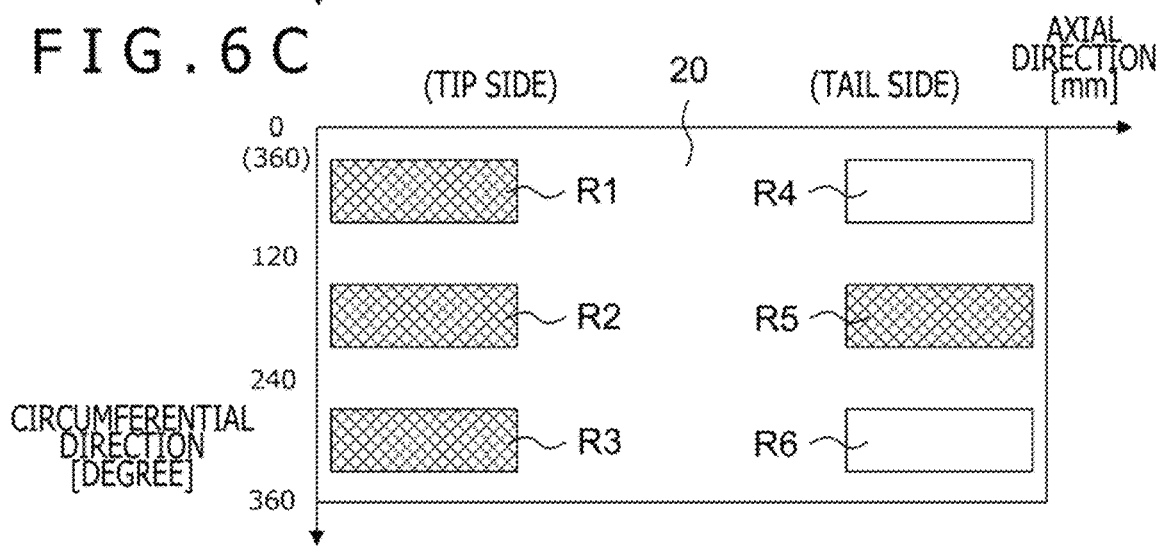
FIG. 6C depicts an example of a determination method of a grasp state.

FIGS. 6A to 6C depict an example of the determination method of the grasp state and schematically illustrate development diagrams of the housing 20 as in FIG. 3B. Note that, to facilitate the understanding, hatched rectangles among the detection regions R1 to R6 in a total of six locations represent regions in which contact by a human body is detected, and blank rectangles represent regions in which contact by a human body is not detected.

As illustrated in FIG. 6A, it is assumed that contact by a human body is simultaneously detected in the detection regions R1 to R3 in all three locations on the tip side. Meanwhile, it is assumed that contact by a human body is not detected in the detection regions R4 to R6 in all three locations on the tail side. In this case, the control circuit 42 determines that the user Us is in a state of grasping the tip side of the stylus 16 with the intention of using the pen function.

As illustrated in FIG. 6B, it is assumed that contact by a human body is not simultaneously detected in the detection regions R1 to R3 in all three locations on the tip side. Meanwhile, it is assumed that contact by a human body is simultaneously detected in the detection regions R4 to R6 in all three locations on the tail side. In this case, the control circuit 42 determines that the user Us is in a state of grasping the tail side of the stylus 16 with the intention of using the eraser function.

In this way, whether there is contact by a human body from the entire circumferential direction of the housing 20 is included as one of the determination conditions, and whether the stylus 16 is grasped can be accurately determined. In addition, the distance Dis between the contact sensors 28 and 32 is set to Dis≥100 mm. This can reduce simultaneous detection by the contact sensors 28 and 32, and the direction of the grasp of the stylus 16 can be easily determined. Nevertheless, if the contact sensors 28 and 32 simultaneously detect contact by a human body, determination may be made according to the following rule.

As illustrated in FIG. 6C, it is assumed that contact by a human body is simultaneously detected in the detection regions R1 to R3 in all three locations on the tip side. Meanwhile, it is determined that contact by a human body is detected in the detection region R5 in one location on the tail side. This contact state may be detected when, for example, the user Us uses a plurality of fingers to grasp the tip side, and at the same time, the user Us grasps the stylus 16 such that the tail side contacts the base of the thumb.

Here, when the number of detected locations on the tip side and the number of detected locations on the tail side are the same, the control circuit 42 may determine that the user Us grasps the side with a larger number of detected locations. In the example of FIG. 6C, the control circuit 42 determines that the user Us is in the state of grasping the tip side of the stylus 16 with the intention of using the pen function.

Figure 5:
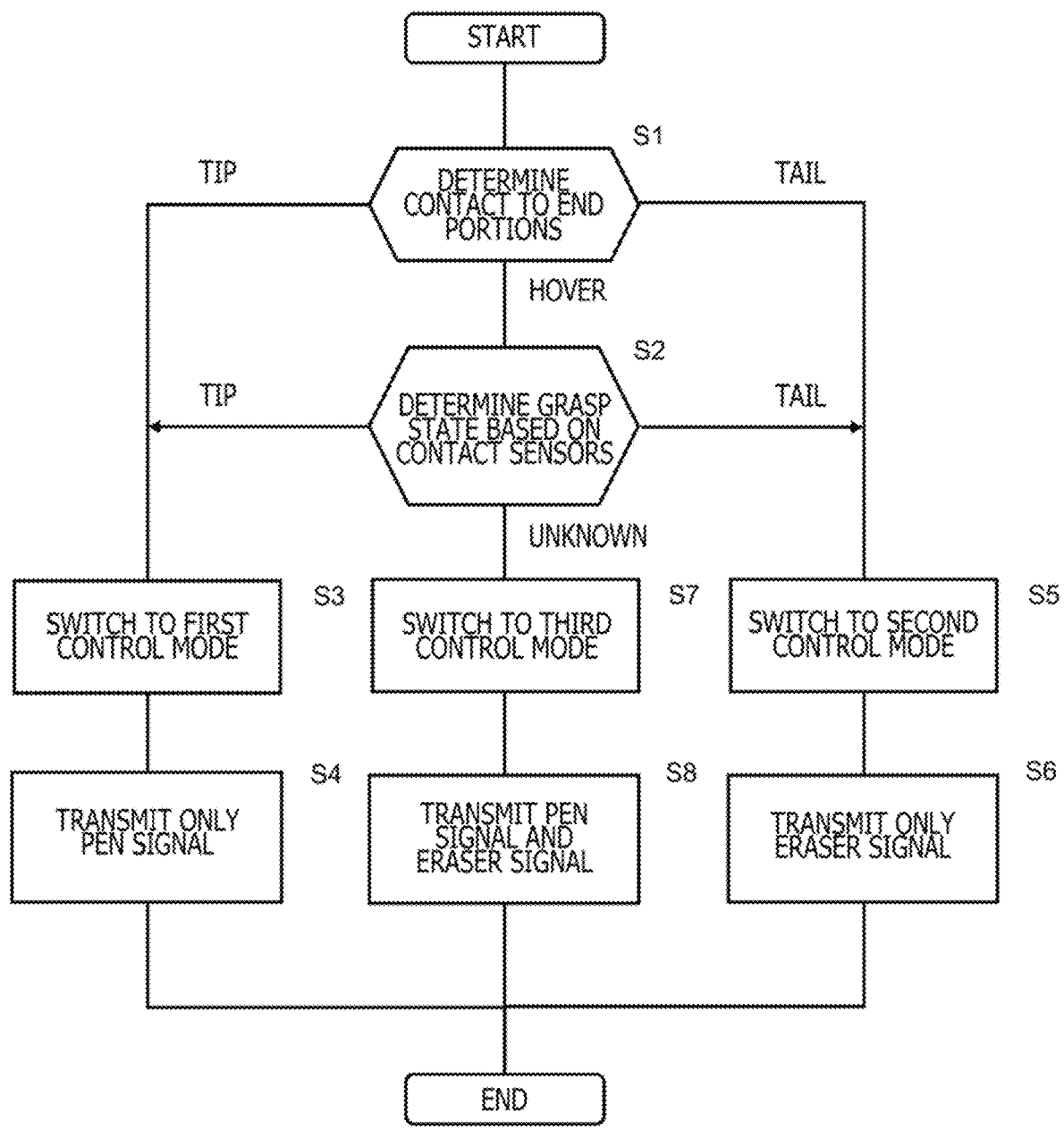
FIG. 5 is a flow chart for describing an operation of the stylus according to the first embodiment.

At S2 of FIG. 5, if the determination condition of the tip side is satisfied (S2: tip), the control circuit 42 proceeds to S3. In addition, if the determination condition of the tail side is satisfied (S2: tail), the control circuit 42 proceeds to S5. On the other hand, if the determination conditions are not satisfied (S2: unknown), the control circuit 42 proceeds to S7.

At S3, when the determination is "tip" in one of S1 and S2, the control circuit 42 switches the mode and performs the first transmission mode of transmitting only the pen signal to the outside. Specifically, the control circuit 42 supplies a control signal for generating the pen signal toward the tip side transmission circuit 38 and supplies a control signal for stopping the generation of the eraser signal toward the tail side transmission circuit 40. As a result, the pen signal is generated by the tip side transmission circuit 38 and transmitted to the outside through the tip electrode 22e (S4).

At S5, when the determination is "tail" in one of S1 and S2, the control circuit 42 switches the mode and executes the second transmission mode of transmitting only the eraser signal to the outside. Specifically, the control circuit 42 supplies a control signal for stopping the generation of the pen signal toward the tip side transmission circuit 38 and supplies a control signal for generating the eraser signal toward the tail side transmission circuit 40. As a result, the eraser signal is generated by the tail side transmission circuit 40 and transmitted to the outside through the tail electrode 24c (S6).

At S7, when the determination is "hover" at S1 and "unknown" at S2, the control circuit 42 switches the mode and executes the third transmission mode of transmitting both the pen signal and the eraser signal to the outside. Specifically, the control circuit 42 supplies a control signal for generating the pen signal toward the tip side transmission circuit 38 and supplies a control signal for generating the eraser signal toward the tail side transmission circuit 40. As a result, the pen signal is transmitted to the outside through the tip electrode 22e, and at the same time, the eraser signal is transmitted to the outside through the tail electrode 24c (S8). Note that the third transmission mode may be for controlling simultaneous transmission of both the pen signal and the eraser signal or may be for controlling alternate time-division transmission of the pen signal and the eraser signal.

The operation of the flow chart illustrated in FIG. 5 ends in this way. The control circuit 42 repeats the flow chart at each predetermined execution cycle, and the stylus 16 can successively transmit the downlink signals to the electronic device 14.

Advantageous Effects of First Embodiment

As described above, the stylus 16 includes the cylindrical housing 20, the tip portion 22 provided on the tip side of the housing 20 and including the tip electrode 22c, a tail portion 24 provided on the tail side of the housing 20 and including the tail electrode 24e, the power circuit 34 provided in the housing 20, the tip side transmission circuit 38 (first transmission circuit) that receives power from the power circuit 34 to generate the pen signal (first downlink signal) transmitted toward the outside of the housing 20 through the tip electrode 22e, the tail side transmission circuit 40 (second transmission circuit) receiving power from the power circuit 34 to generate the eraser signal (second downlink signal) which is a signal transmitted toward the outside of the housing 20 through the tail electrode 24c and is different from the pen signal, and the control circuit 42 controlling the transmission by the tip side transmission circuit 38 and the tail side transmission circuit 40 according to the plurality of transmission modes.

The plurality of transmission modes include the first transmission mode of performing the transmission control for transmitting the pen signal from the tip electrode 22e and stopping the transmission of the eraser signal from the tail electrode 24c, and the second transmission mode of performing the transmission control for stopping the transmission of the pen signal from the tip electrode 22e and generating the eraser signal from the tail electrode 24c. In the hover state in which both the tip portion 22 and the tail portion 24 do not contact the touch surface 18 of the electronic device 14 including the touch sensors, the control circuit 42 switches and executes the first transmission mode and the second transmission mode based on the determination regarding the grasp state of the housing 20.

In this way, the first transmission mode and the second transmission mode are switched and executed based on the determination regarding the grasp state of the housing 20, and only the downlink signal suitable for the grasp state of the housing 20 can be alternatively transmitted in advance in the hover state. As a result, in the configuration in which the downlink signals can be transmitted from both the tip side and the tail side, the consumption of electrical energy can be reduced while the operation response is secured.

In addition, the stylus 16 may further include a contact sensor 28 (first contact sensor) that detects whether the user Us contacts the housing 20 near the tip portion 22, and the control circuit 42 may control the transmission according to the first transmission mode when the contact sensor 28 detects the contact. The contact near the tip portion 22 is likely to be detected when the user Us uses the tip side of the stylus 16, and this knowledge based on human engineering is used to further improve determination accuracy of the grasp state.

In addition, the contact sensor 28 may be provided in at least three locations along the circumference of the housing 20, and the control circuit 42 may control the transmission according to the first transmission mode when the contact sensor 28 detects contact in three or more locations. The contact by a plurality of fingers from the entire circumferential direction is likely to be simultaneously detected when the user Us uses the tip side of the stylus 16, and this knowledge based on human engineering is used to further improve the determination accuracy of the grasp state.

In addition, the stylus 16 may further include the contact sensor 32 (second contact sensor) that detects whether the user Us contacts the housing 20 near the tail portion 24, and the control circuit 42 may control: (a) the transmission according to the first transmission mode when the contact sensor 28 detects the contact and the contact sensor 32 does not detect the contact; and (b) the transmission according to the second transmission mode when the contact sensor 28 does not detect the contact and the contact sensor 32 detects the contact. This can secure the operation response and reduce the energy consumption when either one of the tip side and the tail side of the stylus 16 is used.

In addition, the plurality of transmission modes may further include the third transmission mode of performing transmission control for transmitting the pen signal from the tip electrode 22e and transmitting the second downlink signal from the tail electrode 24c, and the control circuit 42 may execute the third transmission mode when the grasp state of the housing 20 is not determined. The pen signal and the eraser signal can be transmitted to secure the operation response of the stylus 16 even when one of the tip portion 22 and the tail portion 24 contacts the touch surface 18 with the grasp state not determined.

In addition, the contact sensor 28 and the contact sensor 32 may be arranged to be spaced apart from each other by 100 mm or more in the axial direction of the housing 20. This can reduce the simultaneous detection by the contact sensors 28 and 32, and the direction of the grasp of the stylus 16 can be easily determined.

In addition, each of the contact sensors 28 and 32 may be provided in the same number of locations along the circumference or the axis of the housing 20, and the control circuit 42 may control: (a) the transmission according to the first transmission mode when the number of detected locations of the contact by the contact sensor 28 is greater than the number of detected locations of the contact by the contact sensor 32; and (b) the transmission according to the second transmission mode when the number of detected locations of the contact by the contact sensor 28 is smaller than the number of detected locations of the contact by the contact sensor 32. As a result, the direction of the grasp of the stylus 16 can be accurately determined even when the contact sensors 28 and 32 simultaneously detect the contact by a human body.

In addition, the contact sensors 28 and 32 may be provided in relatively flat locations on the outer peripheral surface of the housing 20 compared to other locations. The flatter the detected location of contact is, the more the finger of human body will come into close contact with the detected location. This further improves the detection accuracy of the contact sensors 28 and 32.

Modifications of First Embodiment

First Example

The detection regions R1 to R6 of the contact sensors 28 and 32 are not limited to the example illustrated in FIG. 3B, and the shape, the positions, or the number of detection regions can be appropriately changed.

Figure 7A:
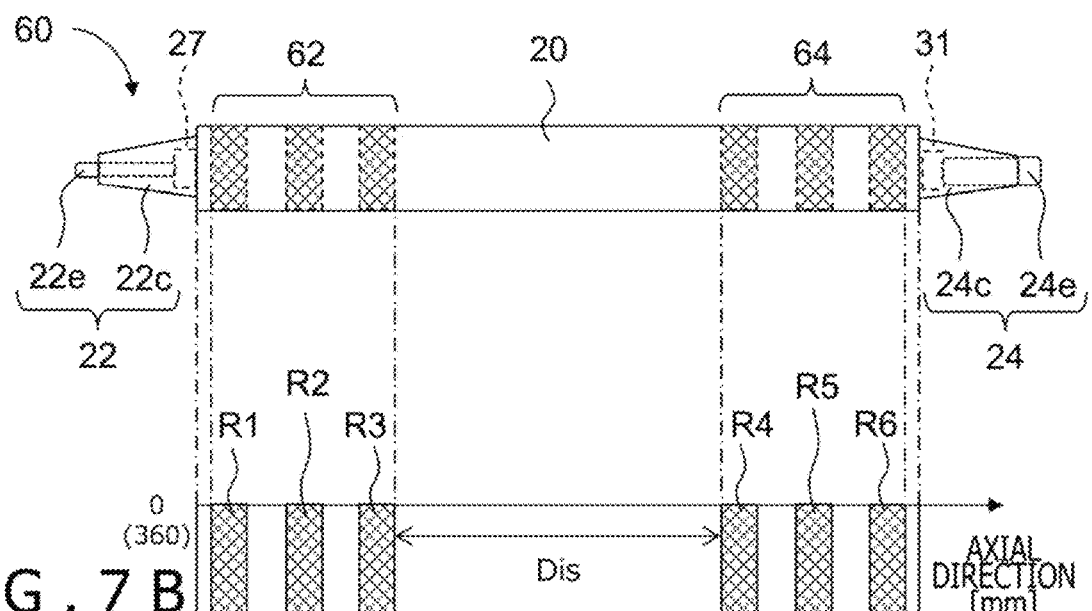
FIG. 7A is a side view of the stylus according to a first modification of the first embodiment.
Figure 7B:
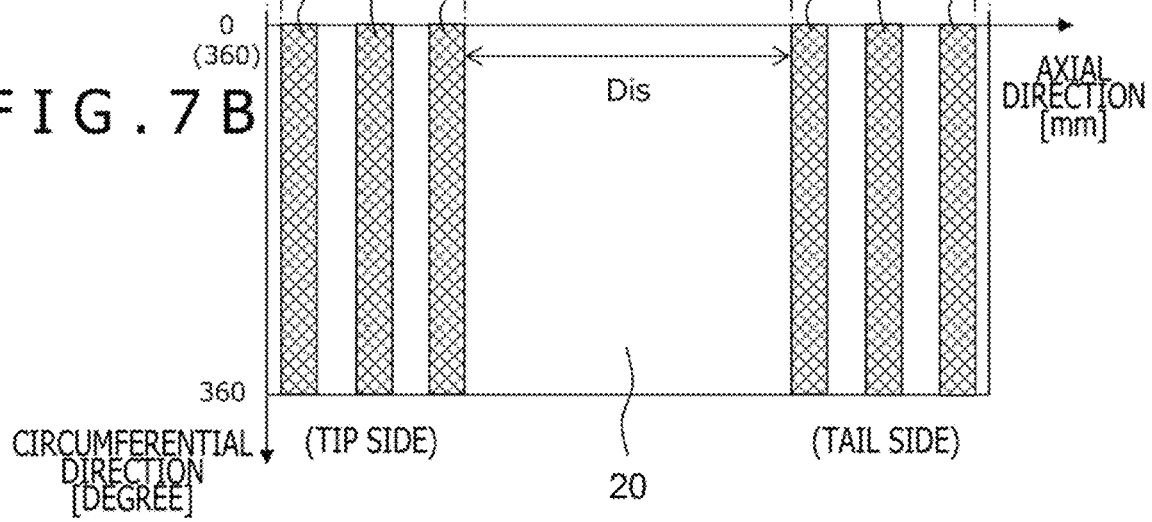
FIG. 7B is a partial development diagram of the housing of the stylus according to the first modification of the first embodiment.

FIGS. 7A and 7B are external views of a stylus 60 according to a first modification of the first embodiment. More specifically, FIG. 7A is a side view of the stylus 60, and FIG. 7B is a partial development diagram of the housing 20. As illustrated in FIG. 7A, in addition to the housing 20, the tip portion 22, and the tail portion 24, the stylus 60 includes contact sensors 62 and 64 shaped differently from the first embodiment (contact sensors 28 and 32).

As illustrated in FIG. 7B, the contact sensor 62 on the tip side includes annular detection regions R1, R2, and R3 from the tip side toward the center. The detection regions R1 to R3 in three locations are arranged at regular intervals in the axial direction of the housing 20. Similarly, the contact sensor 64 on the tail side includes annular detection regions R4, R5, and R6 from the tail side toward the center. The detection regions R4 to R6 in three locations are arranged at regular intervals in the axial direction of the housing 20.

Note that the detection regions R3 and R4 in two locations are arranged to be spaced apart from each other by a distance Dis. The distance Dis is, for example, 50 mm or more or 100 mm or more.

Even when the shapes of the contact sensors 62 and 64 are changed in this way, the grasp state of the housing 20 can be determined as in the first embodiment. Particularly, there is an advantage that the annular shape of the detection regions R1 to R6 allows to obtain uniform detection sensitivity regardless of the rotation posture (angle) of the stylus 60.

Second Example

The shape of the housing 20 is not limited to the example illustrated in FIG. 3A, and the shape can be appropriately changed. For example, a cross section of the housing 20 may be a circle or a polygon, or part of the housing 20 may be processed to allow the user Us to easily grasp the housing 20.

Figure 8A:
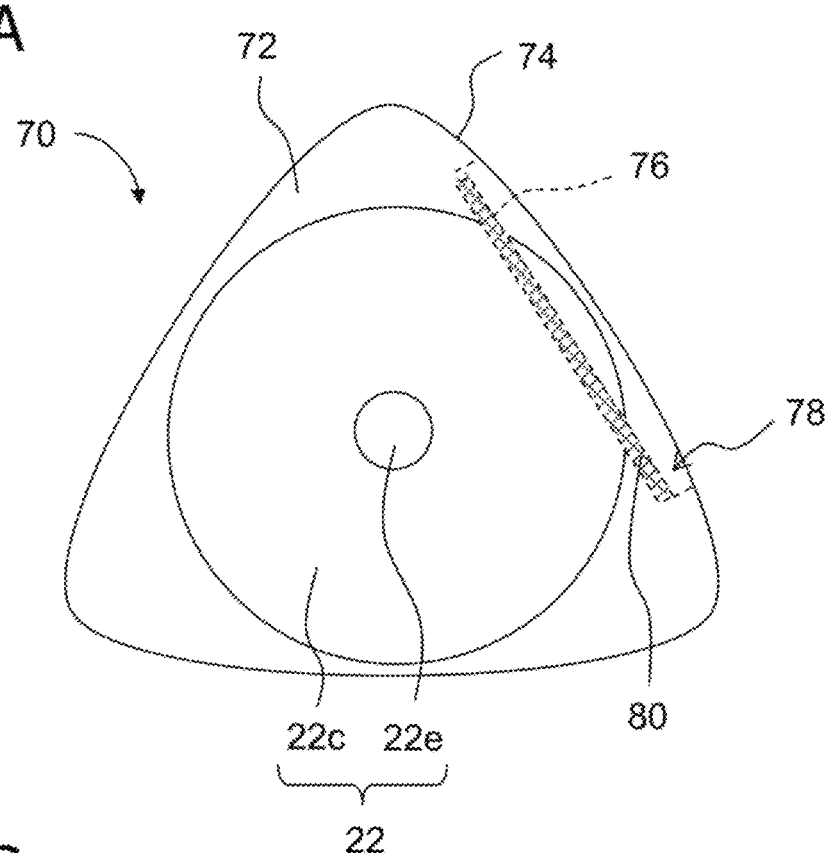
FIG. 8A is an external view of a stylus according to a second modification of the first embodiment.
Figure 8B:
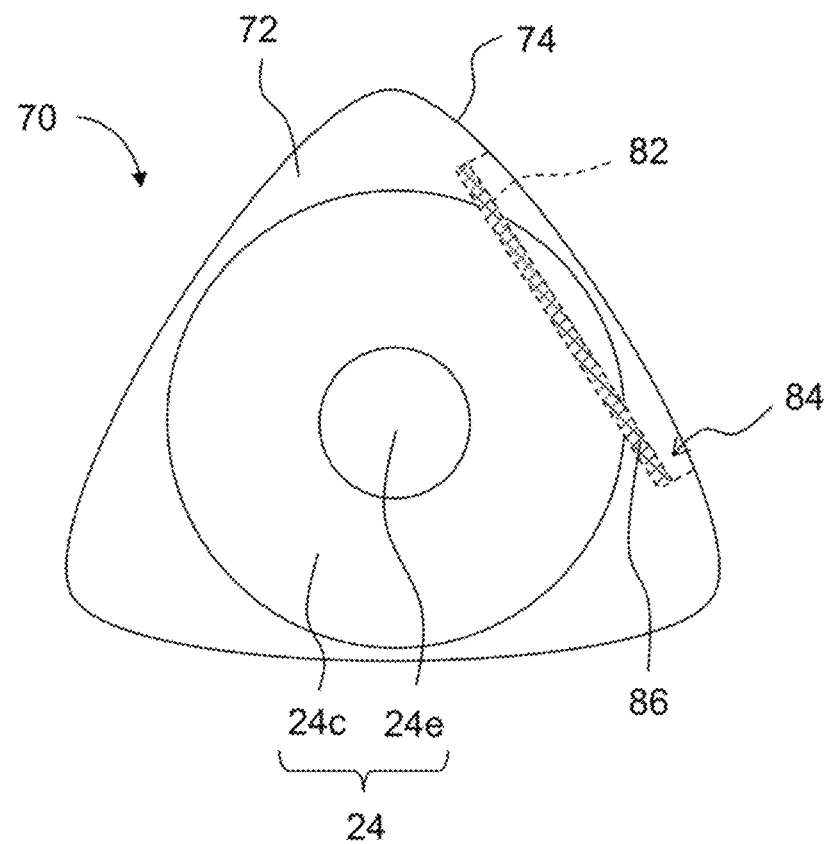
FIG. 8B is an external view of the stylus according to the second modification of the first embodiment.

FIGS. 8A and 8B are external views of a stylus 70 according to a second modification of the first embodiment. More specifically, FIG. 8A is a front view of the stylus 70 as viewed from the tip side, and FIG. 8B is a rear view of the stylus 70 as viewed from the tail side. In addition to the tip portion 22 and the tail portion 24, the stylus 70 includes a housing 72 shaped differently from the first embodiment.

As illustrated in FIG. 8A, a cross-sectional shape of the housing 72 is a Reuleaux triangle as in the first embodiment (housing 20). A recessed portion 78 including a flat receiving surface 76 is formed at a position on an outer peripheral surface 74 of the housing 72, near the tip portion 22. A contact sensor 80 (first contact sensor) that detects contact by a human body is provided on at least the receiving surface 76.

As illustrated in FIG. 8B, a recessed portion 84 including a flat receiving surface 82 is formed at a position on the outer peripheral surface 74 of the housing 72, near the tail portion 24. Also, a contact sensor 86 (second contact sensor) that detects contact by a human body is provided on at least the receiving surface 82.

Even when the shape of the housing 72 is changed in this way, the grasp state of the housing 72 can be determined as in the first embodiment. Particularly, the thumb of the user Us is induced to contact the receiving surface 76 of the recessed portion 78 (or the receiving surface 82 of the recessed portion 84) when the user Us grasps the stylus 70, and this further improves the detection accuracy of the contact sensors 80 and 86.

Third Example

Although the contact sensors 28 and 32 are used to determine the grasp state in the first embodiment, other sensors (particularly, sensors provided for other purposes) may be used in place of the contact sensors 28 and 32. For example, the control circuit 42 may control: (a) the transmission according to the first transmission mode when the end portion sensor 27 detects the most recent contact to the touch surface 18; and (b) the transmission according to the second transmission mode when the end portion sensor 31 detects the most recent contact to the touch surface 18. It is likely that one of the tip portion 22 and the tail portion 24 that most recently contacts the touch surface 18 will be continuously used, and this is taken into account to further improve the determination accuracy of the grasp state.

Fourth Example

Although the first embodiment does not assume a case in which contact to both the tip portion 22 and the tail portion 24 is detected, a process of this case may be also executed. For example, the stylus 16 may be put in a bag or the like when contact to both the tip portion 22 and the tail portion 24 is detected. Therefore, the control circuit 42 may control the transmission to stop the transmission of the pen signal from the tip electrode 22e and to stop the transmission of the eraser signal from the tail electrode 24e. This can prevent consumption of electrical energy in an unexpected state.

Second Embodiment

Next, a stylus 102 according to a second embodiment will be described with reference to FIGS. 9 to 11. Note that the same reference characters are provided to the components and the functions similar to the first embodiment, and the components and the functions may not be described.

<Overall Configuration of Position Detection System 100>

As illustrated in FIG. 1, a position detection system 100 basically includes the electronic device 14 and the stylus 102. Note that the configuration of the electronic device 14 can be the same as or different from the configuration illustrated in FIG. 2.

<Configuration of Stylus 102>

Figure 9:
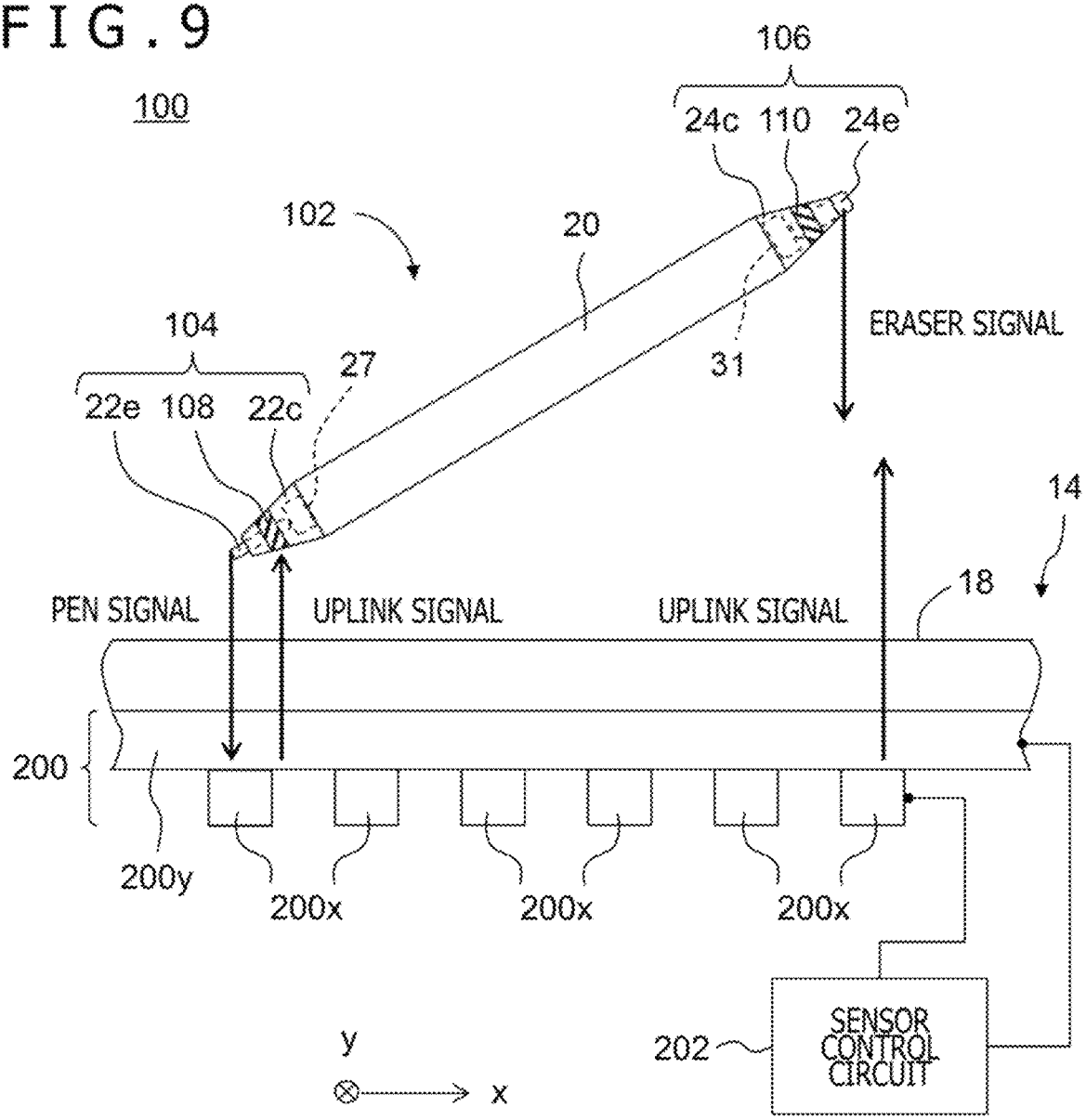
FIG. 9 is an external view of a stylus according to a second embodiment.

FIG. 9 is an external view of the stylus 102 according to the second embodiment, and FIG. 9 illustrates a state in which a tip portion 104 is grasped so as to face the touch surface 18. The stylus 102 includes the cylindrical housing 20, the tip portion 104 provided on the tip side of the housing 20, and a tail portion 106 provided on the tail side of the housing 20.

In addition to the tip electrode 22e and the tip cover 22c, the tip portion 104 in a roughly conical shape includes a ring electrode 108 made of a conductive material. The ring electrode 108 is an electrode receiving an uplink signal and is provided inside or outside of the tip cover 22c. Unlike the configuration of the first embodiment, only the end portion sensor 27 is provided on the tip side of the housing 20.

In addition to the tail electrode 24e and the tail cover 24c, the tail portion 106 in a roughly conical shape includes a ring electrode 110 made of a conductive material. The ring electrode 110 is an electrode receiving an uplink signal and is provided inside or outside of the tail cover 24c. Unlike the configuration of the first embodiment, only the end portion sensor 31 is provided on the tail side of the housing 20.

Incidentally, the sensor control circuit 202 on the electronic device 14 side receives the downlink signal from the stylus 102 through the sensor electrode 200 connected to the control circuit 202. The sensor control circuit 202 then generates an uplink signal including data corresponding to the type of the received downlink signal and transmits the uplink signal through the sensor electrode 200.

In the example of FIG. 9, the tip electrode 22e is at a position close to the touch surface 18 (sensor electrode 200) compared to the tail electrode 24c. Under this positional relation, the electronic device 14 can receive the pen signal from the tip electrode 22e through the sensor electrode 200, and the stylus 102 can receive the uplink signal from the sensor electrode 200 through the ring electrode 108. Conversely, the electronic device 14 cannot receive the eraser signal from the tail electrode 24e through the sensor electrode 200, and the stylus 102 cannot receive the uplink signal from the sensor electrode 200 through the ring electrode 110.

Figure 10:
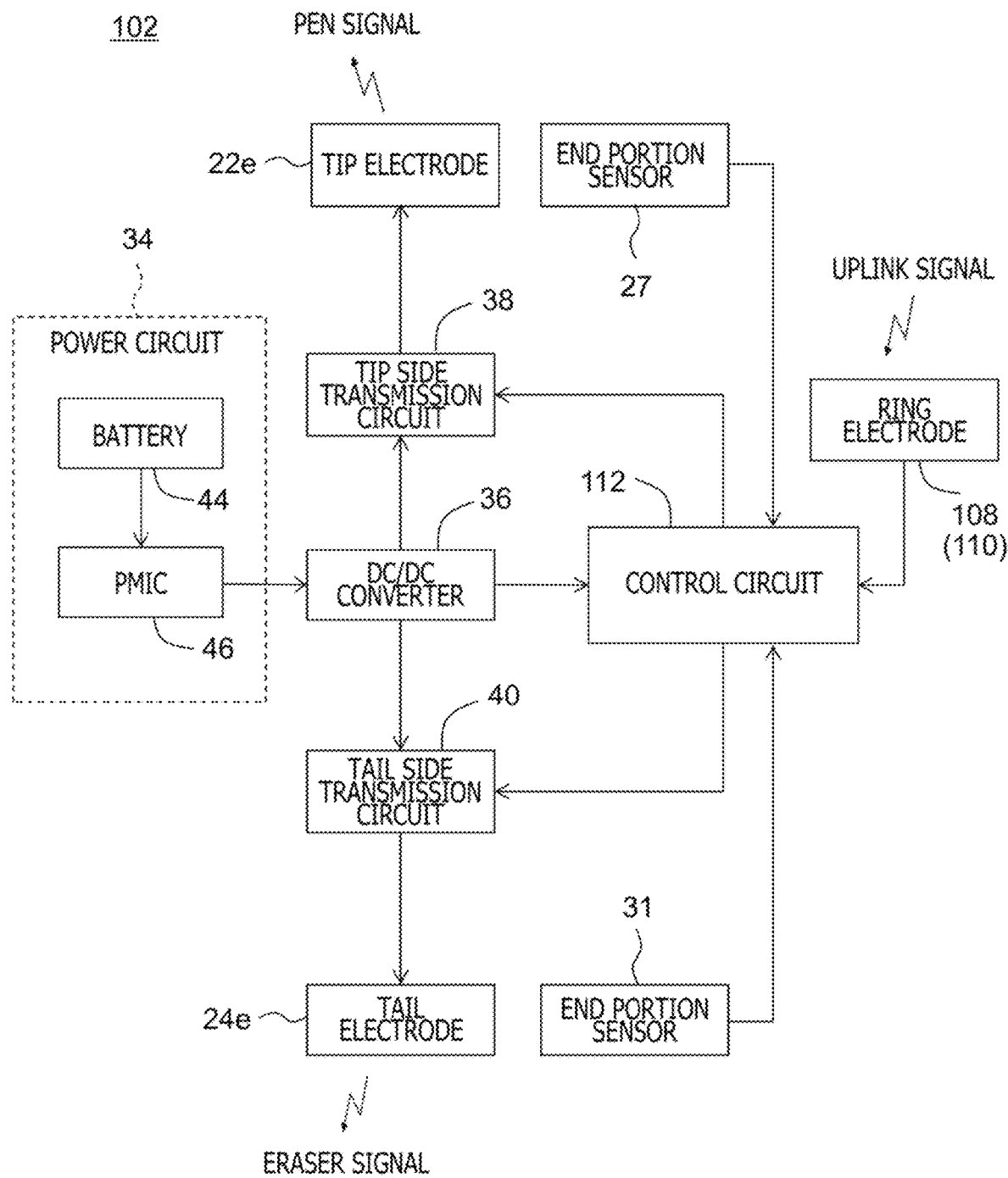
FIG. 10 is an electrical block diagram of the stylus illustrated in FIG. 9.

FIG. 10 is an electrical block diagram of the stylus 102 illustrated in FIG. 9. The stylus 102 includes the tip electrode 22e, the tail electrode 24e, the end portion sensors 27 and 31, the power circuit 34, the DC/DC converter 36, the tip side transmission circuit 38, the tail side transmission circuit 40, the ring electrodes 108 and 110, and a control circuit 112.

The control circuit 112 is a microcomputer that manages the control including the transmission operation of the downlink signal. The control circuit 112 receives detection signals from the end portion sensors 27 and 31 and uplink signals from the ring electrodes 108 and 110 and outputs control signals to the tip side transmission circuit 38 and the tail side transmission circuit 40. As a result, the control circuit 112 can control the transmission by the tip side transmission circuit 38 and the tail side transmission circuit 40 according to at least the first, second, and third transmission modes.

<Operation of Stylus 102>

The stylus 102 in the second embodiment is configured in this way. Next, the operation of the stylus 102 (particularly, transmission control by the control circuit 112) will be described in detail with reference to a flow chart of FIG. 11.

At S11, the control circuit 112 determines whether there is contact to the tip portion 104 or the tail portion 106 based on the detection signals from the end portion sensors 27 and 31. If the tip portion 104 contacts the touch surface 18, the control circuit 112 determines that only the tip portion 104 is in the contact state (S11: tip) and proceeds to S14 described later. On the other hand, if the tail portion 106 contacts the touch surface 18, the control circuit 112 determines that only the tail portion 106 is in the contact state (S11: tail) and proceeds to S16 described later.

On the other hand, if the contact state is not detected from either the tip portion 104 or the tail portion 106, the control circuit 112 determines that the stylus 102 is in the "hover state" (S11: hover) and proceeds to S12.

At S12, the control circuit 112 determines whether the uplink signals are received through the ring electrodes 108 and 110. If the uplink signals are not received (S12: NO), the control circuit 112 proceeds to S20 described later. On the other hand, if the uplink signals are received (S12: YES), the control circuit 112 proceeds to S13.

At S13, the control circuit 112 determines the grasp state of the stylus 102. Here, the control circuit 112 uses the data included in the received uplink signals to determine the grasp state. As can be understood from FIG. 9, the stylus 102 is grasped at a position close to the touch surface 18 of the electronic device 14 during the use. The closer the transmission position of the downlink signal to the touch surface 18 is, the higher the possibility of the reception of the signal by the electronic device 14 tends to be. Hereinafter, a specific example of a determination method based on the tendency will be described.

First, the sensor control circuit 202 on the electronic device 14 side changes part (hereinafter, referred to as identifier) of the data to be transmitted according to the reception status of the downlink signal. The identifier indicates the type of downlink signal most recently received by the electronic device 14. The identifier is binary (1 bit), indicating "0" for the pen signal and "1" for the eraser signal.

For example, the sensor control circuit 202 sets the identifier to "0" when the pen signal is continuously received for longer than a predetermined time or more than a predetermined number of times. The sensor control circuit 202 sets the identifier to "1" when the eraser signal is continuously received for longer than a predetermined time or more than a predetermined number of times. The sensor control circuit 202 sets the identifier to "NULL" in other cases. The sensor control circuit 202 then generates an uplink signal including the identifier and transmits the uplink signal through the sensor electrode 200.

The control circuit 112 analyzes the data indicated by the received uplink signal and determines the grasp state according to the value of the identifier included in the data. More specifically, when the identifier is "0," the control circuit 112 determines that the user Us is grasping the tip side of the stylus 102 with the intention of using the pen function. Also, when the identifier is "1", the control circuit 112 determines that the user Us is grasping the tail side of the stylus 102 with the intention of using the eraser function. Also, when the identifier is "NULL," the control circuit 112 determines that the grasp state is unknown.

Conversely, the identifier may indicate the type of downlink signal not most recently received by the electronic device 14. In this case, the control circuit 112 determines that the user Us is not grasping the tip side of the stylus 102 when the identifier is "0" and determines that the user Us is not grasping the tail side of the stylus 102 when the identifier is "1."

If the determination condition of the tip side is satisfied (S13: tip), the control circuit 112 proceeds to S14. Also, if the determination condition of the tail side is satisfied (S13: tail), the control circuit 112 proceeds to S16. On the other hand, if the determination conditions are not satisfied (S13: unknown), the control circuit 112 proceeds to S18.

At S14, when the determination is "tip" in one of S11 and S13, the control circuit 112 switches the mode and executes the first transmission mode of transmitting only the pen signal to the outside. As a result, the pen signal is generated by the tip side transmission circuit 38 and transmitted to the outside through the tip electrode 22*e* (S15).

At S16, when the determination is "tail" in one of S11 and S13, the control circuit 112 switches the mode and executes the second transmission mode of transmitting only the eraser signal to the outside. As a result, the eraser signal is generated by the tail side transmission circuit 40 and transmitted to the outside through the tail electrode 24*e* (S17).

At S18, when the determination is "hover" at S11 and "NO" at S13, the control circuit 112 switches the mode and executes the third transmission mode of transmitting both the pen signal and the eraser signal to the outside. As a result, the pen signal is transmitted to the outside through the tip electrode 22*e*, and at the same time, the eraser signal is transmitted to the outside through the tail electrode 24*e* (S19).

At S20, when the determination is "NO" at S12, the control circuit 112 is not receiving a command from the electronic device 14 side (that is, transmission trigger of downlink signal), and the control circuit 112 transmits neither the pen signal nor the eraser signal.

Figure 11:
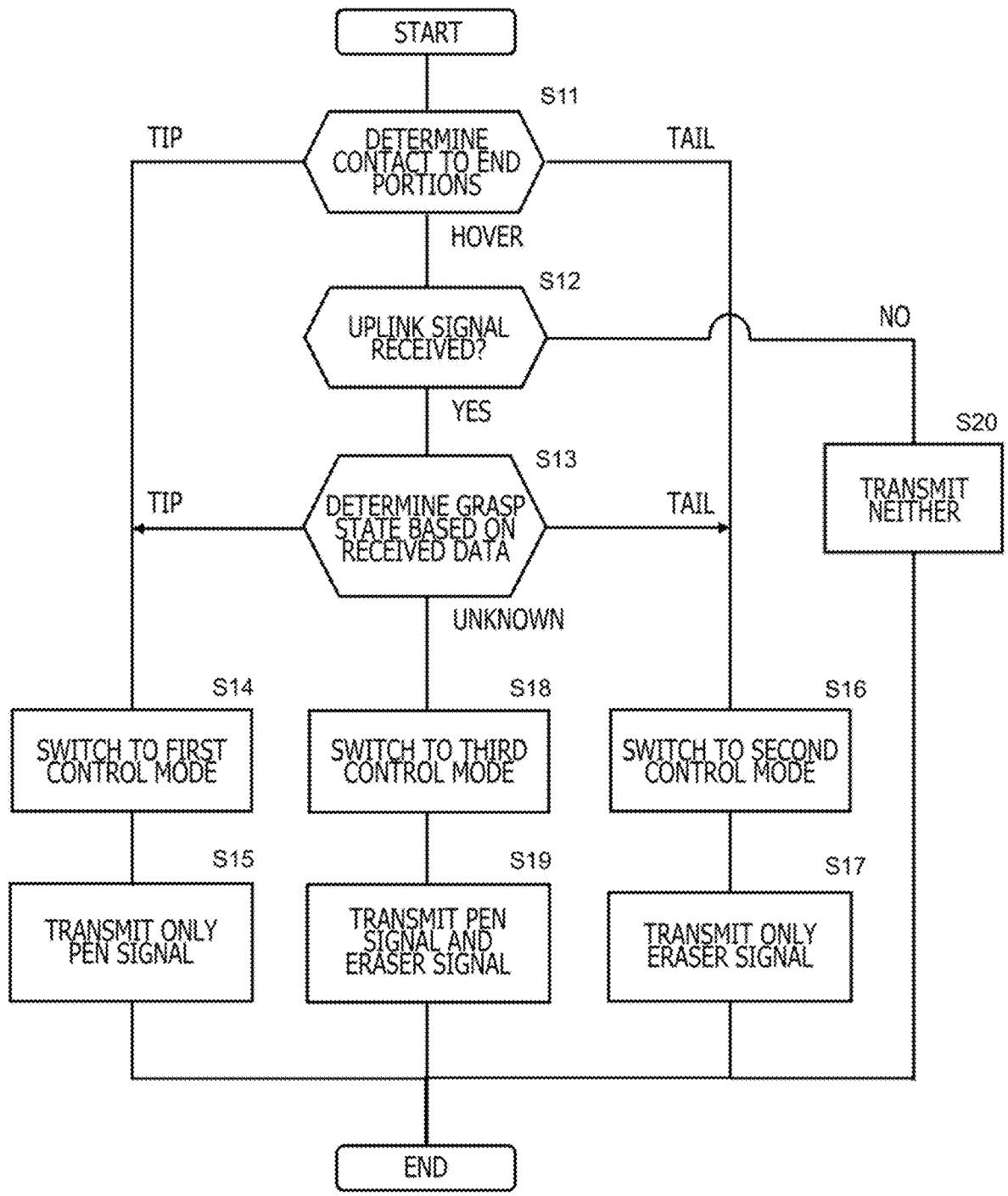
FIG. 11 is a flow chart for describing an operation of the stylus according to the second embodiment.

The operation of the flow chart illustrated in FIG. 11 ends in this way. The control circuit 112 repeats the flow chart at each predetermined execution cycle, and the stylus 102 can successively transmit the downlink signals to the electronic device 14.

Advantageous Effects of Second Embodiment

In this way, in addition to the housing 20, the tip portion 104, the tail portion 106, the power circuit 34, the tip side transmission circuit 38, and the tail side transmission circuit 40, the stylus 102 includes the control circuit 112 that switches and executes the first transmission mode and the second transmission mode based on the determination regarding the grasp state of the housing 20 in the hover state. The control circuit 112 uses the data included in the uplink signal received from the electronic device 14 to determine the grasp state of the housing 20. As a result, in the configuration in which the downlink signals can be transmitted from both the tip side and the tail side, the consumption of electrical energy can be reduced while the operation response is secured, as in the first embodiment.

Also, the data may include the identifier indicating the type of downlink signal received by the electronic device 14, and the control circuit 112 may control: (a) the transmission according to the first transmission mode when the identifier indicates the pen signal; and (b) the transmission according to the second transmission mode when the identifier indicates the eraser signal.

Conversely, the data may include the identifier indicating the type of downlink signal not received by the electronic device 14, and the control circuit 112 may control: (a) the transmission according to the first transmission mode when the identifier indicates the eraser signal; and (b) the transmission according to the second transmission mode when the identifier indicates the pen signal.

Also, the plurality of transmission modes may further include the third transmission mode of performing transmission control for transmitting the pen signal from the tip electrode 22e and transmitting the eraser signal from the tail electrode 24e, and the control circuit 112 may execute the third transmission mode when the grasp state of the housing 20 is not determined. The pen signal and the eraser signal can be transmitted to secure the operation response of the stylus 102 even when one of the tip electrode 22e and the tail electrode 24e contacts the touch surface 18 with the grasp state not determined.

The sensor control circuit 202 that realizes the operation described above receives the downlink signal from the stylus 102 through the connected sensor electrode 200, generates the uplink signal including the data corresponding to one of the pen signal and the eraser signal received, and transmits the uplink signal through the sensor electrode 200.

Here, the data may be used for controlling the transmission by the stylus 102 to continue the transmission of one of the pen signal and the eraser signal. Conversely, the data may be used for controlling the transmission by the stylus 102 to stop the transmission of one of the pen signal and the eraser signal.

Modification of Second Embodiment

Although the ring electrodes 108 and 110 are used to receive the uplink signal in the second embodiment, the tip electrode 22e or the tail electrode 24e may be used to receive the uplink signal instead. For example, when the uplink signal is transmitted and received through the tip electrode 22e, a switchable switch mechanism can be provided to: [1] connect the tip electrode 22e and the transmission circuit during the transmission of the pen signal; and [2] connect the tip electrode 22e and the reception circuit during the reception of the uplink signal.

It is to be noted that the embodiment of the present disclosure is not limited to the foregoing embodiment, and that various changes can be made without departing from the spirit of the present disclosure.

What is claimed is:

1. A stylus that receives an uplink signal from an external sensor control circuit and transmits a downlink signal in response to the uplink signal, the stylus comprising:
   a first electrode provided on a first portion of the stylus;
   a second electrode provided on a second portion of the stylus different from the first portion of the stylus; and
   a control circuit that, in operation, controls transmission of the downlink signal,
   wherein the control circuit, in operation, determines a grasping state of the stylus based on the uplink signal,
   wherein the control circuit, in response to determining the grasping state of the stylus, switches the stylus between a first mode and a second mode,
   wherein in the first mode, the downlink signal is transmitted from the first electrode and the downlink signal is not transmitted from the second electrode,
   wherein in the second mode, the downlink signal is not transmitted from the first electrode and the downlink signal is transmitted from the second electrode,
   wherein the control circuit, in operation, determines the grasping state of the stylus based on data contained in the uplink signal,
   wherein the data includes an identifier corresponding to the first electrode or the second electrode, and
   wherein the control circuit, in operation, selects the first mode or second mode according to the identifier.

2. A stylus that receives an uplink signal from an external sensor control circuit and transmits a downlink signal in response to the uplink signal, the stylus comprising:
   a first electrode provided on a first portion of the stylus;
   a second electrode provided on a second portion of the stylus different from the first portion of the stylus; and
   a control circuit that, in operation, controls transmission of the downlink signal,
   wherein the control circuit, in operation, determines a grasping state of the stylus based on the uplink signal,
   wherein the control circuit, in response to determining the grasping state of the stylus, switches the stylus between a first mode and a second mode,
   wherein in the first mode, the downlink signal is transmitted from the first electrode and the downlink signal is not transmitted from the second electrode,
   wherein in the second mode, the downlink signal is not transmitted from the first electrode and the downlink signal is transmitted from the second electrode, and
   wherein when the control circuit, in operation, does not identify the grasping state, the control circuit selects a third transmission mode in which the downlink signal is transmitted from both the first electrode and the second electrode of the stylus.

3. The stylus of claim 1, wherein the first electrode is a tip electrode of the stylus and the second electrode is a tail electrode of the stylus.

4. A stylus that receives an uplink signal from an external sensor control circuit and transmits a downlink signal in response to the uplink signal, the stylus comprising:
   a first electrode provided on a first portion of the stylus;
   a second electrode provided on a second portion of the stylus different from the first portion of the stylus;
   a control circuit that, in operation, controls transmission of the downlink signal; and
   a sensor provided on the stylus,
   wherein the control circuit, in operation, determines a grasping state of the stylus according to a sensing result of the sensor, and based on the grasping state, switches the stylus between a first mode and a second mode,
   wherein in the first mode, the downlink signal is transmitted from the first electrode and the downlink signal is not transmitted from the second electrode,
   wherein in the second mode, the downlink signal is not transmitted from the first electrode and the downlink signal is transmitted from the second electrode, wherein the sensor includes a first contact sensor provided closer to the first electrode than the second electrode and a second contact sensor provided closer to the second electrode than the first electrode, and wherein the control circuit, in operation, selects the first mode when the first contact sensor detects contact and selects the second mode when the second contact sensor detects contact.

5. The stylus of claim 4, wherein each of the first contact sensor and the second contact sensor has three or more detection areas along a circumference of the stylus, wherein the control circuit, in operation, selects the first mode when the first contact sensor detects contact in the three or more detection areas of the first contact sensor, and wherein the control circuit, in operation, selects the second mode when the second contact sensor detects contact in the three or more detection areas of the second contact sensor.

6. The stylus claim 4, wherein when the control circuit, in operation, does not identify the grasping state, the control circuit selects a third transmission mode in which the downlink signal is transmitted from both the first electrode and the second electrode of the stylus.

7. The stylus of claim 4, wherein the first electrode is a tip electrode of the stylus and the second electrode is a tail electrode of the stylus.

* * * * *